United States Patent
Wirth

(10) Patent No.: US 6,755,286 B2
(45) Date of Patent: Jun. 29, 2004

(54) ELASTIC BRAKE BODY

(75) Inventor: Xaver Wirth, Ismaning (DE)

(73) Assignee: Knorr-Bremse Systeme für Schienenfahrzeuge GmbH, Munich (DE)

(*) Notice: Subject to any disclaimer, the term of this patent is extended or adjusted under 35 U.S.C. 154(b) by 0 days.

(21) Appl. No.: 10/275,108

(22) PCT Filed: Nov. 2, 2001

(86) PCT No.: PCT/EP01/12696
§ 371 (c)(1),
(2), (4) Date: Nov. 1, 2002

(87) PCT Pub. No.: WO02/36981
PCT Pub. Date: May 10, 2002

(65) Prior Publication Data
US 2003/0075400 A1 Apr. 24, 2003

(30) Foreign Application Priority Data
Nov. 2, 2000 (DE) .......................... 100 54 151

(51) Int. Cl.$^7$ .............................................. F16D 65/04
(52) U.S. Cl. .................. 188/249; 188/259; 188/250 B; 188/250 G; 188/215
(58) Field of Search ........................... 188/259, 33, 35, 188/247, 240, 249, 72.2, 73.1, 72.3, 250 B, 73.37, 250 G, 214, 215, 320.1, 234; 488/259, 33, 35, 247, 240, 249, 72.2, 73.1, 72.3, 250 B, 73.37, 250 G, 214, 215, 220.1, 234

(56) References Cited

U.S. PATENT DOCUMENTS

| | | | | |
|---|---|---|---|---|
| 1,239,447 A | * | 9/1917 | Armbrust | 188/255 |
| 2,268,280 A | * | 12/1941 | France | 106/36 |
| 3,473,631 A | * | 10/1969 | Schmid | 188/71.1 |
| 5,090,519 A | * | 2/1992 | Golea et al. | 188/72.6 |
| 5,934,418 A | * | 8/1999 | Wirth | 188/73.1 |
| 6,155,390 A | * | 12/2000 | Ozechowski | 188/259 |
| 6,193,024 B1 | * | 2/2001 | Heppes et al. | 188/73.1 |
| 6,494,301 B1 | * | 12/2002 | Wirth | 188/259 |

FOREIGN PATENT DOCUMENTS

| | | | |
|---|---|---|---|
| DE | 004301006 A1 | * | 7/1994 |
| EP | 2689195 | * | 10/1993 |

* cited by examiner

Primary Examiner—Robert A. Siconolf
Assistant Examiner—Devon Kramer
(74) Attorney, Agent, or Firm—Barnes & Thornburg LLP

(57) ABSTRACT

A brake body, for a brake pad or a disk brake lining, comprising: a support body having at least one recess; at least one friction material element arranged in the at least one recess with the at least one friction material element being movably inserted in a longitudinal direction in the at least one recess and, together with the support body, forming a friction surface; and a share-elastic intermediate layer inserted in a space along the at least one recess between the at least one friction material element and the support body.

25 Claims, 3 Drawing Sheets

ELASTIC BRAKE BODY

BACKGROUND AND SUMMARY OF THE INVENTION

The present invention relates to a brake body, for a brake pad or a disk brake lining, comprising a support body with at least one recess as well as at least one friction material element arranged in the at least one recess and movably disposed along the at least one recess, the support body and the friction material element together forming a friction surface, and a shear-elastic intermediate layer that is inserted in a space along the at least one recess between the at least one friction material element and the support body.

Two large categories of friction brakes exist particularly in the case of rail vehicles. On the one hand, these are the so-called shoe brakes and, on the other hand, the disk brakes.

The shoe brake is a friction brake for rail vehicles which has a cost-effective construction because, in the case of such a braking device, only one application device is required by means of which a brake pad is pressed onto the running surface of the rail wheel. With respect to the construction of pad brakes, reference is made to "Brakes for Rail Vehicles", Manual—Brake-Related Terms and Values, Knorr-Bremse AG München, 1990, Pages 22–23, and Page 41.

Problems with pad brakes, according to the prior art, are particularly the high stressing of the wheel running surface, which shortens the service life of the wheel, as well as a roughening of the wheel running surface and rail corrugation. Particularly the latter effects result in a loud running noise during the rolling of the wheel. These problems with the pad brakes have favored the development and the use of the disk brakes in modern railroad cars.

In the case of a disk brake, the brake disks are mounted on both sides of the wheel body. The brake linings act upon the brake disk. The pertaining wheel is braked as a result of the friction force.

Concerning the construction of disk brakes according to the prior art, reference is made to "Brakes for Rail Vehicles", Manual—Brake-Related Terms and Values, Knorr-Bremse AG München, Page 50.

Brake pads with recesses are known from a plurality of publications. Thus German Patent Document DE-C-277902 shows a brake pad with recesses into which a felt material is inserted. The felt material protrudes beyond the support body, so that no joint friction surface is formed with the support body.

The brake pad known from German Patent Document DE-U-29500977 comprises bores which receive stoppers made of a friction material. The stoppers are fastened by means of a screw on the support body; that is, they are disposed in a rigid manner. An elastic or rocking bearing of individual friction material blocks has not become known from German Patent Document DE-U-29500977.

The brake linings known from German Patent Documents DE-A-4301006, DE-A-4436457 and DE-U-9307017 comprise elastically or rockingly disposed friction material blocks. These are arranged directly on the support body and particularly form no cohesive friction material surface with the support body.

In the case of the pad brakes as well as in the case of the disks brakes, a general problem exists with respect to the contact pressing between brake bodies, that is, the brake pad and the wheel as well as the brake lining and the bake disk respectively.

As a result of thermal expansions of the brake body or of the wheel or the disk as well as their wear, the actual braking value of the above-mentioned friction brakes is always significantly lower than the value which is theoretically possible according to the matter constants.

In the case of pad brakes, there is also the factor that, for running-related reasons, the wheel running surface forms a non-developable surface. Therefore the brake pad often rests on the wheel running surface only in a spot-type manner or forms an extended contact. Because of this contact, the pad brake is extremely overstressed.

Another problem of the above-described braking systems is the contact pattern which is insufficient, for example, because of thermal expansions and axle shifting. Generally, the contact pattern is the poorer, the harder the material. The poor contact pattern results in rail corrugation or in cracking in the wheel running surfaces and therefore in a high development of noise during braking.

A brake body with friction material elements is known from German Patent Document DE 198 40 065. The friction material elements are inserted in recesses in a support body and are disposed to be movable longitudinally of the recesses. By means of this construction, it is possible for the support body and the friction material elements to form a joint friction surface. The described friction material elements have a cylindrical construction, and devices for reducing friction between a receiving wall of the support body and the friction material elements are connected between the receiving wall of the support body and the friction material elements. These devices for reducing the friction may preferably be sleeves made of sheet metal.

However, the just-mentioned cylindrical construction has several problems. Despite the preferably inserted devices for reducing friction, they are subjected to wear because, during each movement of the friction material clement relative to the support body, the frictional material element or the surrounding sleeve slides along the wall of the recess in the support body. Since considerable forces, transversely to the sliding direction of the friction material elements, occur during the braking operation, the friction material elements are tilted or pressed against the interior wall of the recess in the support body, so that, during a relative movement of the friction material element with respect to the support body, a considerable friction force occurs which results in rapid wear. This may lead particularly to a widening of the recess in the support body, which creates the risk that the friction material element will become detached or fall out of the recess. Frequent inspection periods and a frequent exchange of the friction material elements are therefore required, and the widened recesses have to be reworked on a regular basis.

The present invention provides a brake body, particularly for pad brakes and disk brakes, by which the above-mentioned problems are overcome. In particular, the friction between the friction material element and the support body is reduced or avoided and the falling-out of the friction material element is effectively prevented. The construction permits cost-effective production, assembly and maintenance.

According to the present invention, this is achieved in that a displacement of friction material elements in a longitudinal direction of recesses in a support body no longer takes place by sliding but by compression. According to the present invention, a shear-elastic intermediate filling or layer is inserted in a space along the recess between the friction material element and the support body. During braking, this layer allows or causes a compression of the friction material element into or within the recess in the support body into which the friction material element is inserted. The support body and the friction material element may together form a friction surface.

A spring force to counteract the pressing of the friction material element into the recess can be applied by the shear elastic layer alone and/or a conventional elastic element or resilient bearing or may be constructed as a spring. The elastic or spring element may be located between an end of the friction material element opposite a braking area and a base of the recess. When the friction material element, in its longitudinal direction, is disposed on the elastic element, the shear-elastic intermediate layer and the elastic element may comprise the same material. It is a prerequisite here that the material have pressure-elastic as well as shear-elastic characteristics. As a result, the manufacturing costs can be reduced, and the number of materials used can be limited. In a particularly cost-effective manner, the elastic element and the shear-elastic intermediate layer can be constructed as one component.

The shear-elastic layer or filling, according to the present invention, may be used or formed in different ways. For example, a shear-elastic filling may be inserted between the friction material element and the support body. Furthermore, a shear-elastic intermediate layer is conceivable which is placed on or applied as a hose or tubing onto the friction material element. The friction material element may also be coated partially or completely with a shear-elastic material. These various constructions permit, in addition to simplified production, an easy mounting and/or a simple exchange. The shear-elastic layer can also be applied to the support body by, for instance, being placed in the recess.

In order to prevent a falling-out of the friction material element, the friction material element, the shear-elastic layer and the support body may be fixedly connected, for instance, by being glued to one another. As mentioned above, constructions are conceivable in which the shear-elastic layer is applied only to the friction material element or only to the support body and thus adhering the layer to the respective other element or body. The shear-elastic layer may also be placed as an independent component between the friction material element and the support body.

Additionally, a prevention of a falling-out of the friction material element can be achieved by the frictional material element having a conical construction. In one example, the conical shape tapers in the direction of the braking area, so that a falling-out becomes impossible.

In another example, the conically-shaped friction material element widens in the direction of the braking area. If the shear-elastic layer has pressure elastic characteristics, surface pressure between the friction material element and the support body will be reduced because the pressure in the longitudinal direction of the recess is distributed to a larger area. The two conical shapes may be combined with one another in order to be able to obtain all of the above-mentioned positive effects.

The friction material element may be enclosed at least indirectly by the support body from all sides with the exception of the side facing the braking area.

However, another construction may provide a resilient or elastic bearing of the friction material element on a side of the friction material element opposite the braking area and indirectly on a carrier plate. This is particularly appropriate when the friction material element has a conically converging or tapering construction in the direction of the braking area. That allows that friction material element to be inserted, from the carrier plate side, into a conically-shaped recess of the support body. In the case of a construction with a carrier plate, two possibilities of the elastic bearing are conceivable. On the one hand, a pressure-elastic element may be placed between the friction material element and the carrier plate. On the other hand, at least in the area of a bearing area of the friction material element, the carrier plate itself may have an elastic construction and thus exercise a force onto the friction material element.

Other aspects of the present invention will become apparent from the following description of the invention when considered in conjunction with accompanying drawings.

DETAILED DESCRIPTION OF THE PREFERRED EMBODIMENTS

Figure 1:
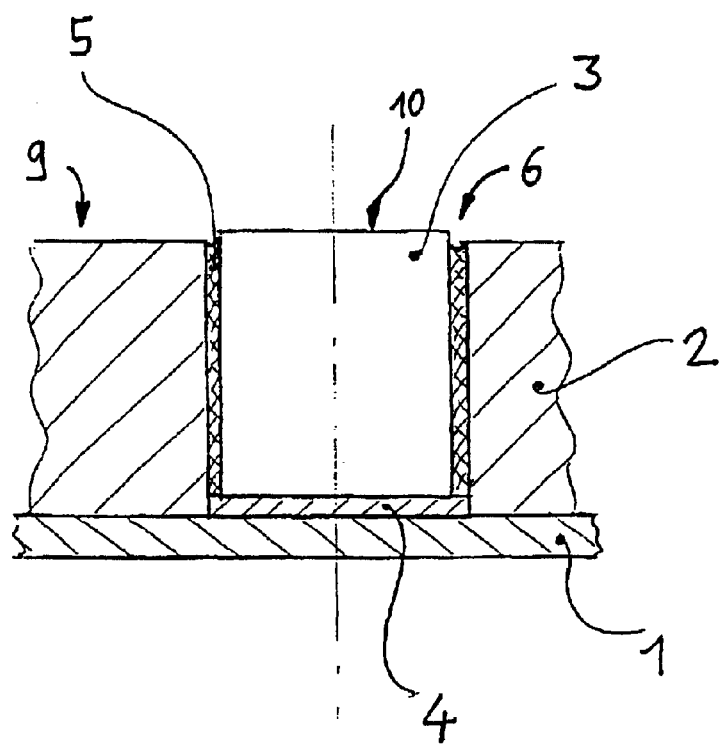
FIG. 1 is a partial cross-sectional view of a brake body having a cylindrical friction material element, according to the present invention.

FIG. 1 shows an elastic brake body 20, according to the present invention. The brake body 20 comprises a carrier plate 1, a support body 2 and a friction material element 3. The support body 2 has a recess 6, which may be constructed as a blind hole. The friction material element 3 is movably inserted into recess 6 in a longitudinal direction of the recess 6. The friction material element 3 is disposed on an elastic or a spring element 4. The spring element 4 is supported on the carrier plate 1. A shear-elastic intermediate layer 5 is inserted into a space 13 along the recess 6 between the friction material element 3 and the support body 2. In a non-braking position, the friction material element 3 may protrude beyond a friction surface 9 of the support body 2. During braking, the friction material element 3 may be pressed onto the spring element 4, in which case the shear-elastic filling 5 ensures a compression without any wear by friction between the friction material element 3 and the support body 2. As a result of the compression, the support body 2 and the friction material element 3 may form a joint friction surface (not identified in the Figures) during the braking, which is composed of the friction surface 9 of the support body 2 and friction surface 10 of the friction material element 3.

Figure 2:
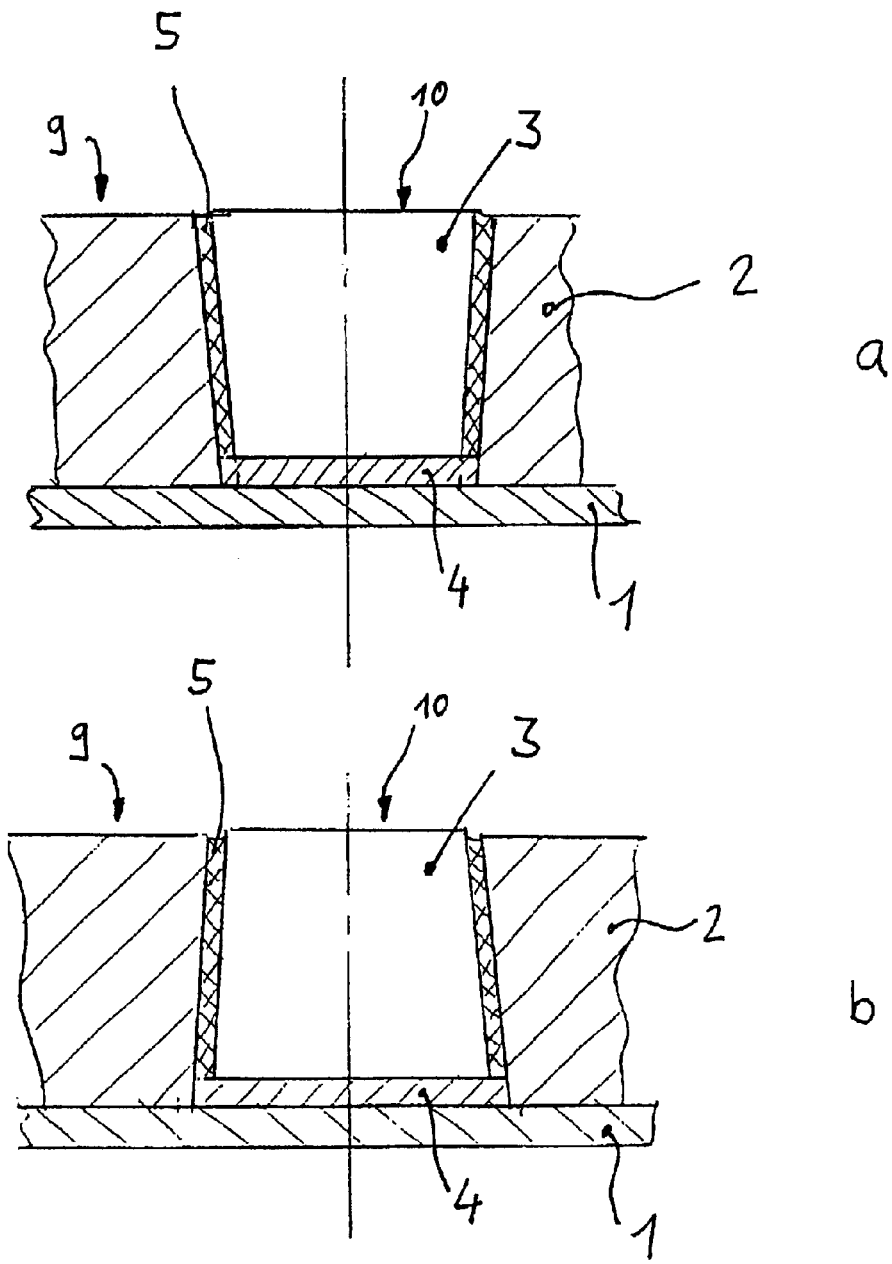
FIG. 2a is a partial cross-sectional view of a brake body having a friction material element which conically widens in the direction of the braking area, according to the present invention.
FIG. 2b is a partial cross-sectional view of a brake body having a friction material element which conically tapers in the direction of the braking area, according to the present invention.

FIG. 2a shows an elastic brake body 25, according to the present invention, which has a conical friction material element 3. The construction illustrated in FIG. 2a shows a conical friction material element 3 which has a diverging or widening cross-section in the direction of a braking area 11. The shear-elastic intermediate layer 5, having pressure-elastic characteristics, may permit a surface pressure between the frictional material element 3 and the support body 2 during the braking operation to be reduced by having a larger effective contact surface. A falling-out of the friction material element 3 may be prevented because the friction material element 3, the shear-elastic intermediate layer 5 and the support body 2 may be fixedly connected with one another. That connection may be by gluing or other equivalent connections.

FIG. 2b shows an elastic brake body 30, according to the present invention, which has a conically constructed friction material element 3 which converges or tapers in its cross-section in the direction of the braking area 11. As in FIG. 2a, friction material element 3 is at least indirectly disposed on a carrier plate 1 by a spring element 4. A shear-elastic intermediate layer 5 is inserted in the space 13 between the friction material element 3 and the support body 2 in the longitudinal direction of the recess 6. As a result of the conically-tapered construction, a falling-out of the friction material element 3 is impossible. When the carrier plate 1 is dismounted a simple mounting of the friction material element 3 in the support body 2 is possible.

A combination of the conically-shaped friction material elements 3, shown in FIGS. 2a and 2b, is possible. For the mounting of such a doubly conically constructed friction material element 3 (not shown), the carrier plate 1 may have to be provided with a conical recess (not shown) corresponding to a course of a contour of an end of the friction material element 3 which may be opposite the braking area 11.

Figure 3:
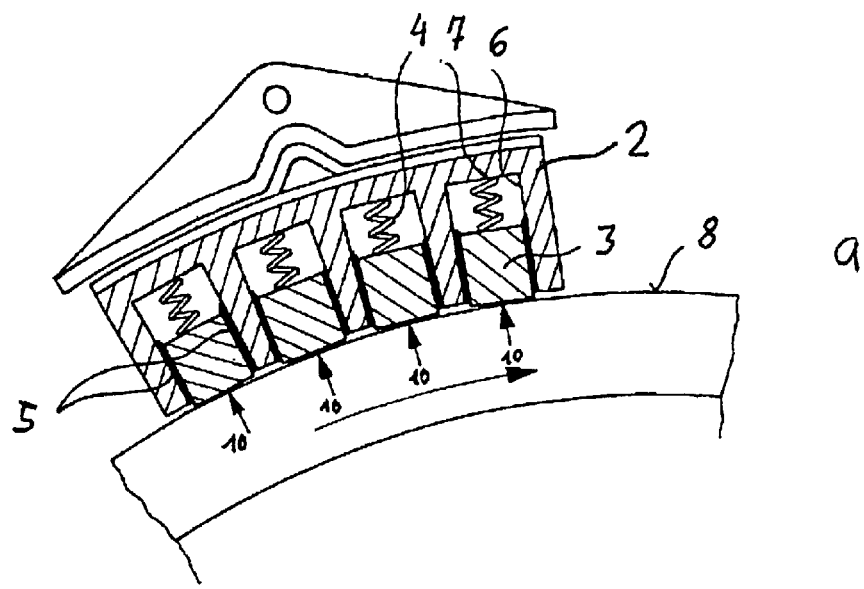
FIG. 3a is a partial cross-sectional view of a brake body whose friction surface is resting on an even wheel running surface and disposed by spring elements, according to the present invention.
FIG. 3b is a partial cross-sectional view of a brake body whose friction surface is resting on an uneven wheel running surface and disposed by spring elements, according to the present invention.
Figure 3:
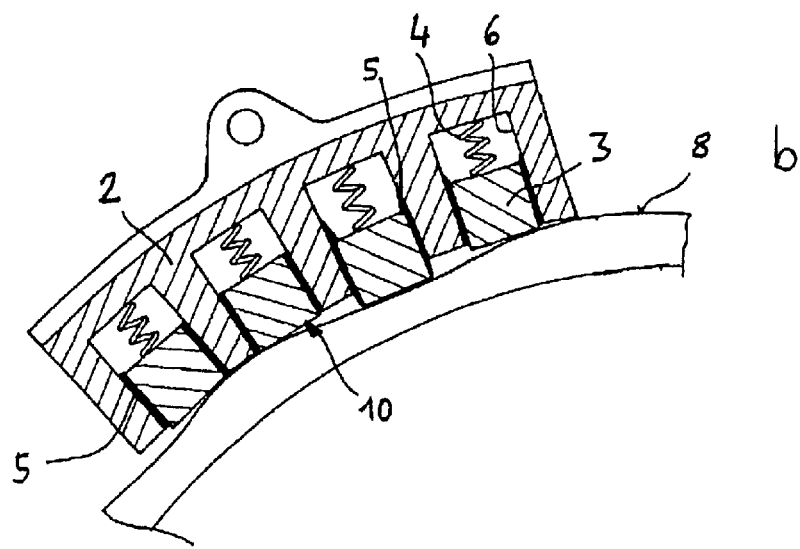

FIG. 3a shows an elastic brake body or brake body arrangement 35, according to the present invention, whose friction surfaces 10 rest against an even wheel running surface 8. The friction material elements 3 are disposed by spring element 4 on a base 7 of the recesses 6 in the support body 2. The shear-elastic intermediate layer 5 prevents friction between the friction material elements 3 and the support body 2.

FIG. 3b shows another elastic brake body or brake body arrangement 40, according to the present invention, whose friction surfaces 10 rest against an uneven wheel running surface 8. Corresponding to a contour or curvature of the wheel running surface 8, the friction material elements 3 may be compressed or may rebound. The shear-elastic intermediate layer 5 may prevent most or all of any friction between the friction material elements 3 and the support body 2. A spring force acting on the friction material elements 3 may be of a shear-elastic spring force of the shear-elastic intermediate layer 5 and of a compressed pressure spring force of the spring elements 4.

Thus, by use of the brake bodies 20, 25, 30 and brake body arrangements 35, 40, according to the present invention, a brake pad or a disk brake lining may be cost-effectively constructed to avoid the occurrence of wearing-away friction between the friction material element 3 and the support body 2. Mounting of the brake bodies 20, 25, 30, and brake body arrangements 35, 40 is cost-effective, and the friction material element 3 is optimally secured against a falling-out. Thus, a durable and secure operation is ensured.

Although the present invention has been described and illustrated in detail, it is to be clearly understood that this is done by way of illustration and example only and is not to be taken by way of limitation. The spirit and scope of the present invention are to be limited only by the terms of the appended claims.

I claim:

1. A brake body, for a brake pad or a disk brake lining, comprising:

a support body having at least one recess;

at least one friction material element arranged in the at least one recess with the at least one friction material element being movably inserted in a longitudinal direction in the at least one recess and, together with the support body, forming a friction surface;

a shear-elastic intermediate layer inserted in a space along the at least one recess between the at least one friction material element and the support body; and wherein the at least one friction material element has a conical shape in a longitudinal direction, the conical shape widening in a direction of a braking area.

2. The brake body according to claim 1, wherein the at least one friction material element is disposed in its longitudinal direction on an elastic element.

3. The brake body according to claim 2, wherein the elastic element comprises a spring.

4. The brake body according to claim 2, wherein the shear-elastic intermediate layer and the elastic element are made of the same material.

5. The brake body according to claim 2, wherein the shear-elastic intermediate layer and the elastic element are constructed as one component.

6. The brake body according to claim 1, wherein the shear-elastic intermediate layer is inserted to fill the space between the at least one friction material element and the support body.

7. The brake body according to claim 1, wherein the shear-elastic intermediate layer is applied concentric to the at least one friction material element.

8. The brake body according to claim 1, wherein the shear-elastic intermediate layer is applied as a coating to the at least one friction material element.

9. The brake body according to claim 1, wherein the at least one friction material element, the shear-elastic intermediate layer and the support body are fixedly connected with one another by gluing.

10. The brake body according to claim 1, wherein the at least one recess is constructed as a blind hole.

11. The brake body according to claim 1, wherein the brake body further includes a carrier plate.

12. The brake body according to claim 11, wherein the at least one friction material element is at least indirectly disposed on the carrier plate.

13. The brake body of claim 1, wherein the conical shape tapers in a direction of a braking area.

14. A brake body, for a brake pad or a disk brake lining, comprising:

a support body having at least one recess;

at least one friction material element arranged in the at least one recess with the at least one friction material element being movably inserted in a longitudinal direction in the at least one recess and, together with the support body, forming a friction surface;

a shear-elastic intermediate layer inserted in a space along the at least one recess between the at least one friction material element and the support body; and wherein the at least one friction material element has a conical shape in a longitudinal direction, the conical shape both widening and tapering in a direction of a braking area.

15. The brake body according to claim 14, wherein the at least one friction material element is disposed in its longitudinal direction on an elastic element.

16. The brake body according to claim 15, wherein the elastic element comprises a spring.

17. The brake body according to claim 15, wherein the shear-elastic intermediate layer and the elastic element are made of the same material.

18. The brake body according to claim 15, wherein the shear-elastic intermediate layer and the elastic element are constructed as one component.

19. The brake body according to claim 14, wherein the shear-elastic intermediate layer is inserted to fill the space between the friction material element and the support body.

20. The brake body according to claim 14, wherein the shear-elastic intermediate layer is applied concentric to the at least one friction material element.

21. The brake body according to claim 14, wherein the shear-elastic intermediate layer is applied as a coating to the at least one friction material element.

22. The brake body according to claim 14, wherein the at least one friction material element, the shear-elastic intermediate layer and the support body are fixedly connected with one another by gluing.

23. The brake body according to claim 14, wherein the at least one recess is constructed as a blind hole.

24. The brake body according to claim 14, wherein the brake body further includes a carrier plate.

25. The brake body according to claim 24, wherein the at least one friction material element is at least indirectly disposed on the carrier plate.

* * * * *